(12) United States Patent
Lan et al.

(10) Patent No.: US 10,601,748 B2
(45) Date of Patent: *Mar. 24, 2020

(54) INFORMATION PROCESSING METHOD AND DEVICE

(71) Applicant: TENCENT TECHNOLOGY (SHENZHEN) COMPANY LIMITED, Shenzhen (CN)

(72) Inventors: Jun Lan, Shenzhen (CN); Wei Zhou, Shenzhen (CN); Xiuxing Du, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,357

(22) Filed: May 24, 2018

(65) Prior Publication Data
US 2018/0270176 A1 Sep. 20, 2018

Related U.S. Application Data

(63) Continuation of application No. 14/639,173, filed as application No. PCT/CN2013/082869 on Sep. 3, 2013, now Pat. No. 10,015,123.

(30) Foreign Application Priority Data

Sep. 7, 2012 (CN) .......................... 2012 1 0330115

(51) Int. Cl.
*G06F 3/048* (2013.01)
*H04L 12/58* (2006.01)
*G06F 3/0484* (2013.01)

(52) U.S. Cl.
CPC .......... *H04L 51/10* (2013.01); *G06F 3/04842* (2013.01); *G06F 3/04847* (2013.01);
(Continued)

(58) Field of Classification Search
None
See application file for complete search history.

(56) References Cited

U.S. PATENT DOCUMENTS 8,875,029 B1 * 10/2014 Naidu ................... G06Q 10/10
715/752
9,002,858 B1 4/2015 Dassa et al.
(Continued)

FOREIGN PATENT DOCUMENTS

CN 1848117 A 10/2006
CN 101030283 A 9/2007
(Continued)

*Primary Examiner* — Claudia Dragoescu
(74) *Attorney, Agent, or Firm* — Anova Law Group, PLLC

(57) ABSTRACT

Embodiments of the present disclosure provide an information processing method and device, relating to the technical field of information processing, and enabling a user to perform an interactive operation on information pushed by an information tips module. The method comprises: receiving by a client side information tips data to be displayed in an information tips module and an identifier of a microblog generated based on the information tips data, which are sent by a server side; invoking and displaying by the client side the information tips module, in which the information tips data and an interactive operation link are displayed; determining by the client side the microblog generated based on the information tips data according to the identifier of the microblog generated based on the information tips data, when the interactive operation link is checked; and invoking by the client side an interactive operation interface that the interactive operation link points to, such that a user can perform, on the interactive operation interface, an interactive operation on the microblog generated based on the information tips data.

20 Claims, 13 Drawing Sheets

(52) U.S. Cl.
CPC .............. *H04L 51/04* (2013.01); *H04L 51/18* (2013.01); *H04L 51/32* (2013.01)

(56) References Cited

U.S. PATENT DOCUMENTS

| | | | |
|---|---|---|---|
| 2011/0196933 A1* | 8/2011 | Jackson | G06Q 10/107 709/206 |
| 2012/0072835 A1* | 3/2012 | Gross | G06Q 10/10 715/243 |
| 2012/0158521 A1* | 6/2012 | McCullen | G06F 16/972 705/14.69 |

FOREIGN PATENT DOCUMENTS

| | | |
|---|---|---|
| CN | 101681478 A | 3/2010 |
| CN | 101930456 A | 12/2010 |
| CN | 102611637 A | 7/2012 |
| CN | 102647366 A | 8/2012 |
| WO | 2009009557 A1 | 1/2009 |

\* cited by examiner

Tencent News

London 2012 Olympics Games Opening Ceremony

The London Organizing Committee of the Olympic Games (LOCOG) has officially declared that: the Opening Ceremony for the 30th Summer Olympics will be launched at the Olympic Statium, Stratford, East London on July 27, 2012, at 20: 12 London Time.

View more news...

INFORMATION PROCESSING METHOD AND DEVICE

CROSS-REFERENCE TO RELATED APPLICATIONS

This present application is a continuation application of U.S. patent application Ser. No. 14/639,173, filed on Mar. 5, 2015, and now U.S. Pat. No. 10,015,123 issued on Jul. 3, 2018. U.S. patent application Ser. No. 14/639,173 (now issued as U.S. Pat. No. 10,015,123) is a continuation application of claiming priority to International Application No. PCT/CN2013/082869, filed on Sep. 3, 2013, which claims priority to Chinese Patent Application No. 201210330115.8, entitled INFORMATION PROCESSING METHOD AND DEVICE, filed with the State Intellectual Property Office of China on Sep. 7, 2012. The entire disclosures of all of the above applications are incorporated herein by reference.

FIELD OF INVENTION

The present disclosure relates to the technical field of information processing, and more particularly to an information processing method and device.

BACKGROUND

Currently, users may achieve communicating and sharing of information through an instant messaging client (such as Tencent Microblog or Tencent QQ). When a user is using an instant messaging client, an information tips module (tips) is employed to filter information transmitted to the instant messaging client and push valuable information to the user. The tips is a "text and picture" message box, which is irregularly triggered when the user is online, and may be popped up in the bottom right corner of the screen window, using the instant messaging client as a platform. For example, when the user is using Tencent Microblog or Tencent QQ, a news tips, which is configured to push and display some valuable news content, may be popped up in the bottom right corner of the display screen.

Although the prior tips is capable of pushing information, a user is not allowed to perform interactive operations, such as comment, share, rebroadcast and the like, on information pushed by the tips.

SUMMARY OF THE INVENTION

Embodiments of the present disclosure provide an information processing method and device, whereby a user may perform an interactive operation on information pushed by an information tips module.

To achieve the abovementioned aim, the following technical solutions shall be employed by embodiments of the present disclosure:

In one aspect, an information processing method is provided, comprising:

receiving information tips data to be displayed in an information tips module and an identifier of a microblog generated based on the information tips data, which are sent by a server side;

invoking and displaying the information tips module, in which the information tips data and an interactive operation link are displayed;

determining the microblog generated based on the information tips data according to the identifier of the microblog generated based on the information tips data, when the interactive operation link is checked; and invoking an interactive operation interface that the interactive operation link points to, such that a user can perform, on the interactive operation interface, an interactive operation on the microblog generated based on the information tips data.

Optionally, the receiving information tips data to be displayed in an information tips module and an identifier of a microblog generated based on the information tips data, which are sent by a server side, comprises:

receiving the information tips data to be displayed in the information tips module and the identifier of the microblog generated based on the information tips data, which are sent by an information tips server side;

wherein, the server side comprises the information tips server side and a microblog system server side; the information tips server side being configured to generate the information tips data to be displayed in the information tips module and send the information tips data to the microblog system server side, and the microblog system server side being configured to generate the microblog based on the information tips data and send the identifier of the microblog generated based on the information tips data to the information tips server side.

An information processing method is further provided, comprising:

generating information tips data to be displayed in an information tips module and a microblog based on the information tips data, by a server side;

sending the information tips data to be displayed in the information tips module and an identifier of the microblog generated based on the information tips data to a client side, by the server side, so as to trigger the client side to invoke and display the information tips module in which the information tips data and an interactive operation link are displayed, wherein when the interactive operation link is checked, the client side determines the microblog generated based on the information tips data according to the identifier of the microblog generated based on the information tips data; and invokes an interactive operation interface that the interactive operation link points to, such that a user can perform, on the interactive operation interface, an interactive operation on the microblog generated based on the information tips data.

Optionally, the server side comprises an information tips server side and a microblog system server side; generating information tips data to be displayed in an information tips module and a microblog based on the information tips data, by a server side, comprises:

generating the information tips data to be displayed in the information tips module and sending the information tips data to the microblog system server side by the information tips server side; and receiving the information tips data and generating the microblog based on the information tips data by the microblog system server side.

Optionally, sending the information tips data to be displayed in the information tips module and an identifier of the microblog generated based on the information tips data to a client side, by the server side, comprises:

sending the identifier of the microblog generated based on the information tips data to the information tips server side, by the microblog system server side; and sending the information tips data to be displayed in the information tips module and the identifier of the microblog generated based on the information tips data to the client side, by the information tips server side.

Optionally, the information tips data comprises: a title, an image, a summary and a link pointing to detailed information;

receiving the information tips data and generating the microblog based on the information tips data by the microblog system server side comprises:

creating a microblog;

converting the title of the information tips data into a topic of the microblog;

converting the image of the information tips data into an image of the microblog;

converting the summary of the information tips data into content of the microblog; and converting the link pointing to detailed information in the information tips data into a link in the microblog.

In another aspect, embodiments of the present disclosure provide a client side, comprising:

a receiving module, configured to receive information tips data to be displayed in an information tips module and an identifier of a microblog generated based on the information tips data, which are sent by a server side;

an invoking and processing module, configured to invoke and display the information tips module, in which the information tips data and an interactive operation link are displayed; and a determining module, configured to determine the microblog generated based on the information tips data according to the identifier of the microblog generated based on the information tips data, when the interactive operation link is checked;

wherein the invoking and processing module is configured to invoke an interactive operation interface that the interactive operation link points to, such that a user can perform, on the interactive operation interface, an interactive operation on the microblog generated based on the information tips data.

Optionally, the receiving module is specifically configured to receive the information tips data to be displayed in the information tips module and the identifier of the microblog generated based on the information tips data, which are sent by an information tips server side;

wherein, the information tips server side is configured to generate the information tips data to be displayed in the information tips module and send the information tips data to a microblog system server, which is configured to generate the microblog based on the information tips data and send the identifier of the microblog generated based on the information tips data to the information tips server side.

A server side is further provided, comprising:

a generating module, configured to generate information tips data to be displayed in an information tips module, and to generate a microblog based on the information tips data;

a sending module, configured to send the information tips data to be displayed in the information tips module and an identifier of the microblog generated based on the information tips data to a client side, so as to trigger the client side to invoke and display the information tips module, in which the information tips data and an interactive operation link are displayed, wherein when the interactive operation link is checked, the client side determines the microblog generated based on the information tips data according to the identifier of the microblog generated based on the information tips data; and invokes an interactive operation interface that the interactive operation link points to, such that a user can perform, on the interactive operation interface, an interactive operation on the microblog generated based on the information tips data.

Optionally, the server side comprises an information tips server side and a microblog system server side;

the information tips server side is configured to generate the information tips data to be displayed in the information tips module and send the information tips data to the microblog system server side; and the microblog system server side is configured to receive the information tips data and generate the microblog based on the information tips data.

The microblog system server side is configured to send the identifier of the microblog generated based on the information tips data to the information tips server side; and the information tips server side is configured to send the information tips data to be displayed in the information tips module and the identifier of the microblog generated based on the information tips data to the client side.

Optionally, the information tips data comprises: a title, an image, a summary and a link pointing to detailed information;

the microblog system server side is specifically configured to create a microblog; convert the title of the information tips data into a topic of the microblog; convert the image of the information tips data into an image of the microblog; convert the summary of the information tips data into content of the microblog; and convert the link pointing to detailed information in the information tips data into a link in the microblog.

The present disclosure further provides a method for providing information, comprising:

receiving information tips data and an identifier of a microblog sent by an information tips server, wherein the microblog is generated by a microblog system server based on the information tips data, and the identifier of the microblog is received from the microblog system server by the information tips server; and displaying the information tips data to a user, and providing the user with an interactive operation link according to the identifier of the microblog, so as to invoke an interactive operation interface that the interactive operation link points to when the interactive operation link is clicked, such that the user can perform an interactive operation on the microblog on a client side.

Optionally, the method further comprises:

determining that the information tips data is data of a preset type, after the receiving information tips data and an identifier of a microblog sent by an information tips server.

Optionally, the interactive operation interface is a rebroadcast interface for the microblog.

Optionally, the method further comprises:

determining whether the user is a registered user of the microblog system server, prior to invoking an interactive operation interface that the interactive operation link points to; and displaying a registration page to the user, in the case that the user is not a registered user.

Optionally, the interactive operation interface comprises a share button for sharing a result of the interactive operation onto an additional information communication platform.

Optionally, the interactive operation interface comprises a shortcut sign button allowing for a comment on the microblog without requiring keyboard input by the user.

Optionally, the interactive operation interface comprises a vote creation button for creating a vote for the microblog.

The present disclosure further provides a client side for providing information, comprising a processor and a memory, wherein, the memory stores executable program code, which is operable to: when being executed by the processor, receive information tips data and an identifier of a microblog sent by an information tips server, wherein the microblog is generated by a microblog system server based on the information tips data, and the identifier of the microblog is received from the microblog system server by the information tips server; and display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

The present disclosure further provides a non-transitory computer program product comprising executable program code for providing information, wherein the executable program code is operable to: when being executed, receive information tips data and an identifier of a microblog sent by an information tips server, wherein the microblog is generated by a microblog system server based on the information tips data, and the identifier of the microblog is received from the microblog system server by the information tips server; and display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on a client side.

The present disclosure further provides a method for pushing information, comprising:

sending information tips data to a microblog system server, so as for the microblog system server to generate a microblog based on the information tips data;

receiving an identifier of the microblog sent by the microblog system server; and sending the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

Optionally, the method further comprises:

determining that the information tips data is data of a preset type, prior to sending the information tips data to the microblog system server.

The present disclosure further provides an information tips server for pushing information, comprising a processor and a memory, wherein, the memory stores executable program code, which is operable to: when being executed by the processor, send information tips data to a microblog system server, so as for the microblog system server to generate a microblog based on the information tips data;

receive an identifier of the microblog sent by the microblog system server; and send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

The present disclosure further provides a non-transitory computer program product comprising executable program code for pushing information, wherein the executable program code is operable to: when being executed, send information tips data to a microblog system server, so as for the microblog system server to generate a microblog based on the information tips data;

receive an identifier of the microblog sent by the microblog system server; and send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

The present disclosure further provides a method for processing information, comprising:

receiving information tips data sent by an information tips server;

generating a microblog based on the information tips data; and sending an identifier of the microblog to the information tips server, which then can send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

Optionally, the method further comprises:

broadcasting the microblog, after generating a microblog based on the information tips data.

Optionally, generating a microblog based on the information tips data further comprises:

converting a title of the information tips data into a topic of the microblog;

converting content of the information tips data into content of the microblog; and converting a link pointing to detailed information in the information tips data into a link in the microblog.

Optionally, generating a microblog based on the information tips data further comprises:

converting an image of the information tips data into an image of the microblog.

The present disclosure further provides a microblog system server for processing information, comprising a processor and a memory, wherein, the memory stores executable program code which is operable to: when being executed by the processor, receive information tips data sent by an information tips server;

generate a microblog based on the information tips data; and send an identifier of the microblog to the information tips server, which then can send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation relating on the microblog on the client side.

The present disclosure further provides a non-transitory computer program product comprising executable program code for processing information, wherein the executable program code is operable to: when being executed, receive information tips data sent by an information tips server;

generate a microblog based on the information tips data; and send an identifier of the microblog to the information tips server, which then can send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

According to the abovementioned technical solutions, after the information tips module displays the information tips data and the interactive operation link, if the interactive operation link displayed in the information tips module is checked by the user, the client side may determine the microblog generated based on the information tips data according to the identifier of the microblog generated based on the information tips data; and invoke the interactive operation interface that the interactive operation link points to, such that the user can perform, on the interactive operation interface, an interactive operation on the microblog generated based on the information tips data. Since the microblog on which the user performs the operation is generated based on the information tips data, an interactive operation on the information tips data is thus achieved, and the interactive operation may be, for example, comment, repost, share, vote, etc. As compared to the prior art according to which a user cannot perform interactive operations, such as comment, share, rebroadcast and the like, on information pushed by the tips, embodiments of the present disclosure enable the user to achieve interactive operations on information pushed by the information tips module.

BRIEF DESCRIPTION OF THE DRAWINGS

In order to render a clearer presentation of the embodiments of the present disclosure or the technical solutions in the prior art, a simple introduction shall be made to the accompanying drawings required in the description of the embodiments or the prior art. It is apparent that the accompanying drawings in the following description only illustrate some embodiments of the present disclosure. Those of ordinary skill in the art would also be able to acquire other drawings according to these accompanying drawings, at no cost of creative labor.

DETAILED DESCRIPTION

In the following discussion, a clear and thorough description of technical solutions in the embodiments of the present disclosure shall be provided, by referring to the accompanying drawings for the embodiments of the present disclosure. It is apparent that the embodiments described shall be only a portion, instead of all, of the embodiments of the present disclosure. All other embodiments acquired by those of ordinary skill in the art on the basis of embodiments of the present disclosure at no cost of creative labor shall fall within the scope of protection of the present disclosure.

Embodiment 1

This embodiment of the present disclosure provides an information processing method, which is executed by a client side, and which comprises the following steps.

101. The client side receives information tips data to be displayed in an information tips module and an identifier of a microblog generated based on the information tips data, which are sent by a server side.

In one possible implementation, the client side may be instant messaging software, such as Tencent Microblog or Tencent QQ, which is provided to a user for direct operation. When the user logs in the client side and stays online, the information tips module may be popped up and displayed in the bottom right corner of the screen at a specific time. The information tips module may be in the form of a message box, and the information tips data may be displayed in the information tips module. For example, a news tips may be configured to display some valuable news contents.

The server side is a side as opposed to the client side, and facilitates the achieving of the function of the client side through corresponding data interaction with the client side. The server side is generally invisible to the user.

102. The client side invokes and displays the information tips module, in which the information tips data and an interactive operation link are displayed.

The information tips data comprises: a title, an image (optional), a summary and a link pointing to detailed information.

The interactive operation link is configured to point to an interactive operation interface where an interactive operation is executed. The interactive operation link may be in a particular form of an icon or button. The interactive operation may be, for example, comment, share, rebroadcast or other interactive operations performed on the information tips data.

Figure 1:
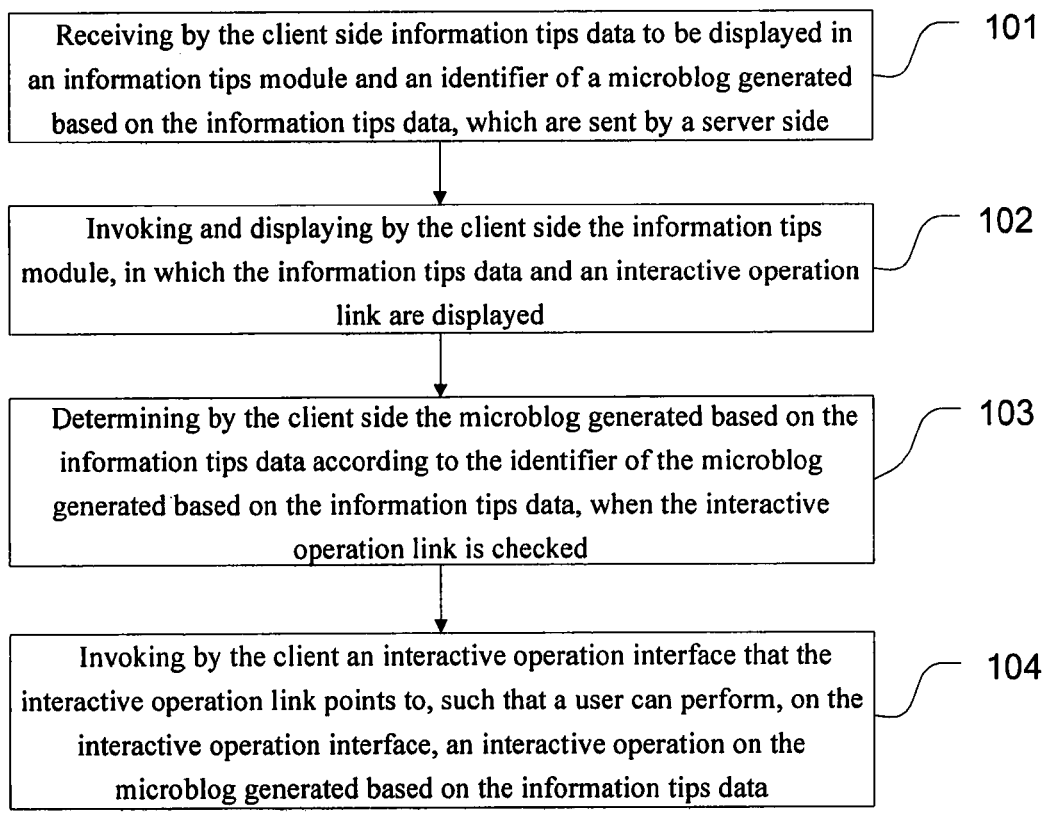
FIG. 1 illustrates a flow chart of an information processing method according to Embodiment 1 of the present disclosure.
Figure 2:
FIG. 2 illustrates a schematic diagram of a display interface for an information tips module according to Embodiment 1 of the present disclosure.

Taking rebroadcast and comment for example, as illustrated in FIG. 2 is a display interface for the information tips module, which includes an icon (denoted by a five-pointed star) for performing "share". When clicking the share icon, the user may rebroadcast and comment on the information tips data.

103. When the interactive operation link is checked, the client side determines the microblog generated based on the information tips data according to the identifier of the microblog generated based on the information tips data.

104. The client side invokes an interactive operation interface that the interactive operation link points to, such that a user can perform, on the interactive operation interface, an interactive operation on the microblog generated based on the information tips data.

Figure 3:
FIG. 3 illustrates a schematic diagram of a rebroadcast operation interface according to Embodiment 1 of the present disclosure.

In one possible implementation, the client side achieves invoking the interactive operation interface that the interactive operation link points to by invoking an API (Application Program Interface) for achieving the corresponding interactive operation. For example, when the abovementioned user clicks the share icon on the tips interface shown in FIG. 2, a rebroadcast interface for performing an interactive operation on the microblog generated based on the information tips data will be invoked and displayed by invoking the API for microblog rebroadcast. That is, the operation on the information tips data will be converted to an operation on the microblog generated based on the information tips data. The displayed interactive operation interface for rebroadcast may be the same as the interactive operation interface for microblog rebroadcast according to the prior art. For example, when the abovementioned user clicks the share icon (denoted by a five-pointed star) on the tips interface as shown in FIG. 2, the rebroadcast operation interface will be displayed, as shown in FIG. 3, wherein, the text between the two "#" is the title in the information tips data, and the cursor is placed after the two "#" for the convenience of commenting by the user. After finishing inputting a comment, the user may click "post" in the bottom right corner to complete the comment.

It shall be easily understood that when the interactive operation link is checked, the client side may also determine, prior to executing the steps 103 and 104, whether the user has registered on Microblog. If not, the client side will invoke and display a page for reminding the user to register on Microblog. Otherwise, the abovementioned steps 103 and 104 will be executed.

According to this embodiment of the present disclosure, after the information tips module of the client side displays the information tips data and the interactive operation link, if the interactive operation link displayed in the information tips module is checked by the user through the client side, the client side may determine the microblog generated based on the information tips data according to the identifier of the microblog generated based on the information tips data, and invoke the interactive operation interface that the interactive operation link points to, such that the user can perform, on the interactive operation interface, an interactive operation on the microblog generated based on the information tips data. Since the microblog on which the user performs the operation is generated based on the information tips data, an interactive operation on the information tips data is thus achieved, and the interactive operation may be, for example, comment, repost, share, vote, etc. As compared to the prior art according to which a user cannot perform interactive operations, such as comment, share, rebroadcast and the like, on information pushed by the tips, this embodiment of the present disclosure enables the user to achieve interactive operations on information pushed by the information tips module.

Optionally, the server side in the step 101 as mentioned above comprises an information tips server side and a microblog system server side. One implementation of the abovementioned step 101 is that: the client side receives the information tips data to be displayed in the information tips module and the identifier of the microblog generated based on the information tips data, which are sent by the information tips server side.

The information tips server side is configured to generate the information tips data to be displayed in the information tips module and send the information tips data to the microblog system server side, and the microblog system server side is configured to generate the microblog based on the information tips data and send the identifier of the microblog generated based on the information tips data to the information tips server side.

It should be noted that the abovementioned interactive operation is described by taking rebroadcast and comment for example. Apparently, the abovementioned method provided by this embodiment of the present disclosure may also be applied to other interactive operations. For example, some pull-down options may be added to the abovementioned tips interface to allow for sharing the user's rebroadcast of and comment on the information tips data to Qzone, Friends network, IM chat, Group and other instant messaging clients. For another example, some buttons, such as signs including Support, Trample, Silent Tribute, etc., may be added to the tips interface, so as for the user to quickly express his/her own opinion. For another example, there is vote creation, whereby several opinions are summarized, and microblog friends may be allowed to vote, etc., with no limitation to be imposed herein.

Figure 4:
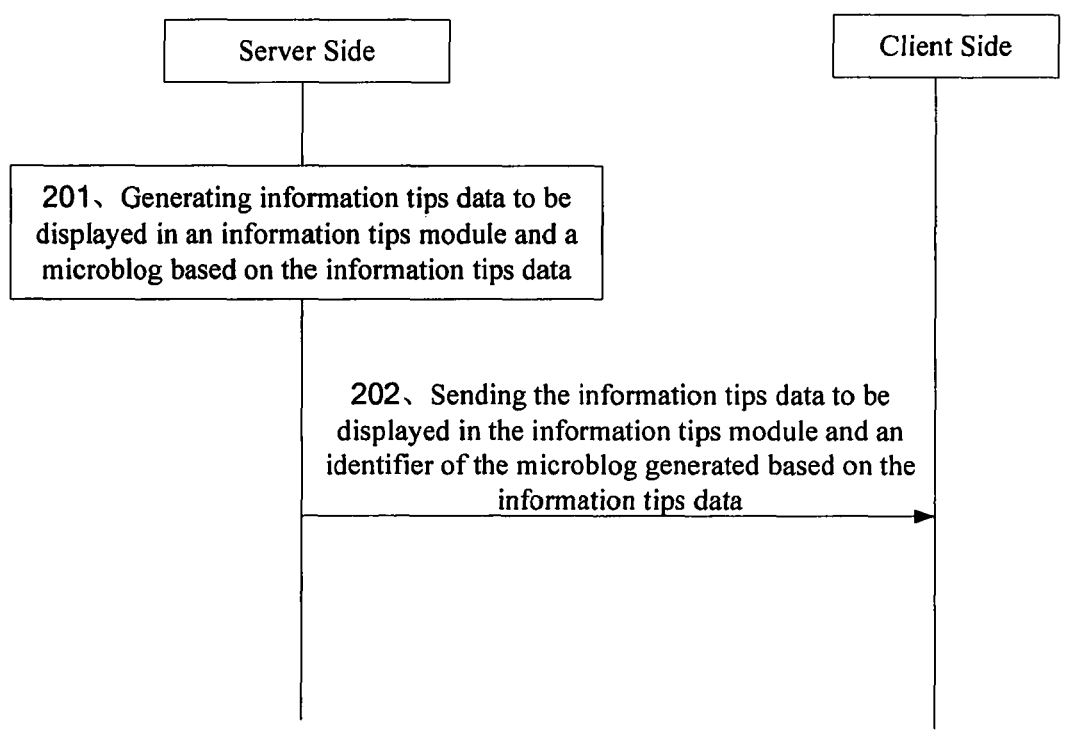
FIG. 4 illustrates a flow chart of another information processing method according to Embodiment 1 of the present disclosure.

Accordingly, as shown in FIG. 4, this embodiment of the present disclosure also provides another information processing method, which is executed by a server side, and which comprises the following steps:

201. The server side generates information tips data to be displayed in an information tips module and a microblog based on the information tips data.

202. The server side sends the information tips data to be displayed in the information tips module and an identifier of the microblog generated based on the information tips data to a client side.

In this embodiment, the server side may generate the information tips data to be displayed in the information tips module and the microblog based on the information tips data, and then, send the information tips data to be displayed in the information tips module and the identifier of the microblog generated based on the information tips data to the client side, so as to trigger the client side to invoke and display the information tips module in which the information tips data and an interactive operation link are displayed.

When the interactive operation link is checked, the client side determines the microblog generated based on the information tips data according to the identifier of the microblog generated based on the information tips data, and invokes an interactive operation interface that the interactive operation link points to, such that a user can perform, on the interactive operation interface, an interactive operation on the microblog generated based on the information tips data.

Since the microblog on which the user performs the operation is generated based on the information tips data, an interactive operation on the information tips data is thus achieved. The interactive operation may be, for example, comment, repost, share, vote, etc. As compared to the prior art according to which a user cannot perform interactive operations, such as comment, share, rebroadcast and the like, on the information pushed by the tips, this embodiment of the present disclosure enables the user to achieve interactive operations on the information pushed by the information tips module.

Figure 5:
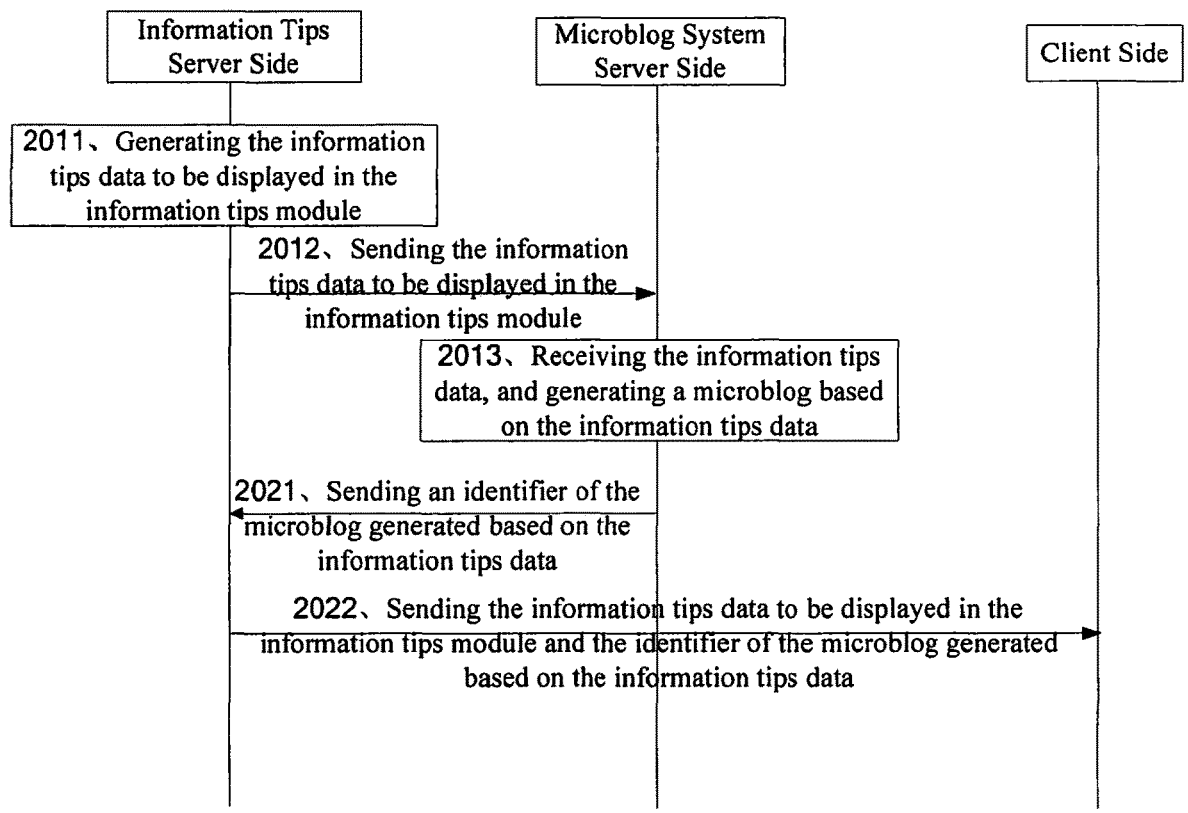
FIG. 5 illustrates a flow chart of another information processing method according to Embodiment 1 of the present disclosure.

As shown in FIG. 5, in one implementation of this embodiment, the server side comprises an information tips server side and a microblog system server side.

Optionally, as shown in FIG. 5, one implementation of the abovementioned step 201 comprises the following sub-steps:

2011. The information tips server side generates the information tips data to be displayed in the information tips module;

2012. The information tips server side sends the information tips data to the micorblog system server side;

2013. The microblog system server side receives the information tips data, and generates the microblog based on the information tips data.

The information tips data comprises: a title, a image, a summary and a link pointing to detailed information.

Generating the microblog based on the information tips data comprises: creating a microblog; converting the title of the information tips data into a topic of the microblog; converting the image of the information tips data into an image of the microblog; converting the summary of the information tips data into content of the microblog; and converting the link pointing to detailed information in the information tips data into a link in the microblog.

It should be noted that in the abovementioned process of generating the microblog based on the information tips data, the microblog may be created by an official account, but it surely may also be created by other accounts.

Optionally, as shown in FIG. 5, one implementation of the abovementioned step 202 comprises the following sub-steps:

2021. The microblog system server side sends the identifier of the microblog generated based on the information tips data to the information tips server side;

2022. The information tips server side sends the information tips data to be displayed in the information tips module and the identifier of the microblog generated based on the information tips data to the client side.

Embodiment 2

Figure 6:
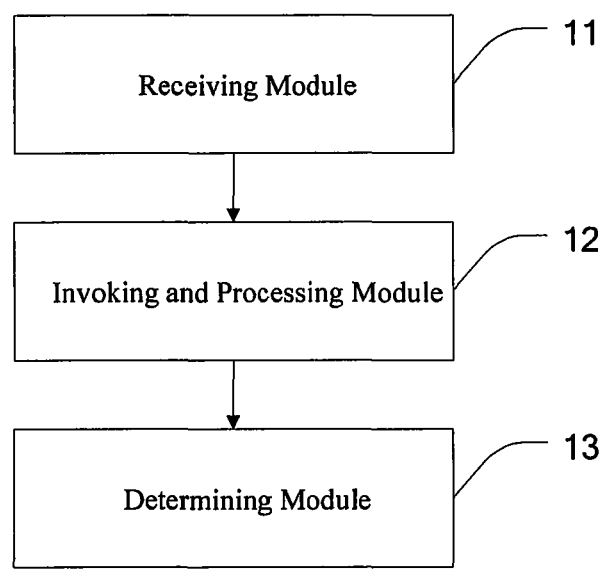
FIG. 6 illustrates a structure diagram of a client side according to Embodiment 2 of the present disclosure.

As shown in FIG. 6, this embodiment of the present disclosure provides a client side comprising:

a receiving module 11, configured to receive information tips data to be displayed in an information tips module and an identifier of a microblog generated based on the information tips data, which are sent by a server side;

an invoking and processing module 12, configured to invoke and display the information tips module, in which the information tips data and an interactive operation link are displayed; and a determining module 13, configured to determine the microblog generated based on the information tips data according to the identifier of the microblog generated based on the information tips data, when the interactive operation link is checked.

The invoking and processing module 12 is configured to invoke an interactive operation interface that the interactive operation link points to, such that a user can perform, on the interactive operation interface, an interactive operation on the microblog generated based on the information tips data.

In this embodiment of the present disclosure, after the information tips module of the client side displays the information tips data and the interactive operation link, if the interactive operation link displayed in the information tips module is checked by the user through the client side, the client side may determine the microblog generated based on the information tips data according to the identifier of the microblog generated based on the information tips data, and invoke the interactive operation interface that the interactive operation link points to, such that the user can perform, on the interactive operation interface, an interactive operation on the microblog generated based on the information tips data. Since the microblog on which the user performs the operation is generated based on the information tips data, an interactive operation on the information tips data is thus achieved. The interactive operation may be, for example, comment, repost, share, vote, etc. As compared to the prior art according to which a user cannot perform interactive operations, such as comment, share, rebroadcast and the like, on the information pushed by the tips, this embodiment of the present disclosure enables the user to achieve interactive operations on the information pushed by the information tips module.

In one possible implementation, the receiving module 11 is specifically configured to receive the information tips data to be displayed in the information tips module and the identifier of the microblog generated based on the information tips data, which are sent by an information tips server side.

The information tips server side is configured to generate the information tips data to be displayed in the information tips module and send the information tips data to a microblog system server side, which is configured to generate the microblog based on the information tips data and send the identifier of the microblog generated based on the information tips data to the information tips server side.

Figure 7:
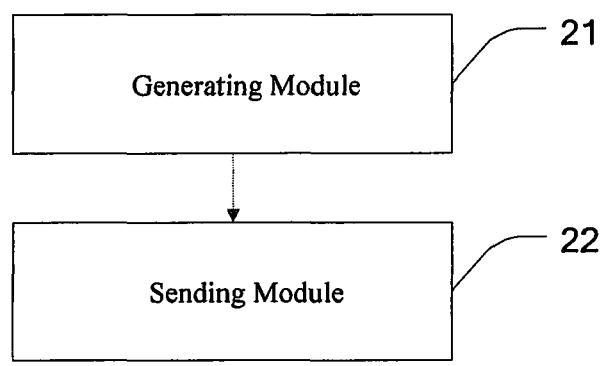
FIG. 7 illustrates a structure diagram of a server side according to Embodiment 2 of the present disclosure.

As shown in FIG. 7, this embodiment of the present disclosure provides a server side comprising:

a generating module 21, configured to generate information tips data to be displayed in an information tips module, and to generate a microblog based on the information tips data;

a sending module 22, configured to send the information tips data to be displayed in the information tips module and an identifier of the microblog generated based on the information tips data to a client side.

In this embodiment, the server side may generate the information tips data to be displayed in the information tips module and the microblog based on the information tips data, and then, send the information tips data to be displayed in the information tips module and the identifier of the microblog generated based on the information tips data to the client side, so as to trigger the client side to invoke and display the information tips module in which the information tips data and an interactive operation link are displayed. When the interactive operation link is checked, the client side determines the microblog generated based on the information tips data according to the identifier of the microblog generated based on the information tips data, and invokes an interactive operation interface that the interactive operation link points to, such that a user can perform, on the interactive operation interface, an interactive operation on the microblog generated based on the information tips data.

Since the microblog on which the user performs the operation is generated based on the information tips data, an interactive operation on the information tips data is thus achieved. The interactive operation may be, for example, comment, repost, share, vote, etc. As compared to the prior art according to which a user cannot perform interactive operations, such as comment, share, rebroadcast and the like, on the information pushed by the tips, this embodiment of the present disclosure enables the user to achieve interactive operations on the information pushed by the information tips module.

Figure 8:
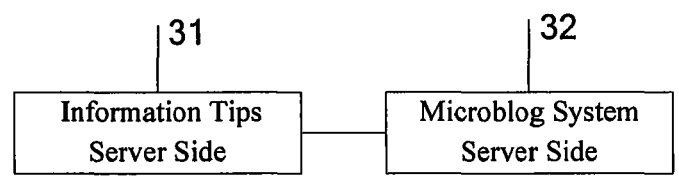
FIG. 8 illustrates a structure diagram of another server side according to Embodiment 2 of the present disclosure.

In one possible implementation, as shown in FIG. 8, the server side comprises an information tips server side 31 and a microblog system server side 32;

The information tips server side 31 is configured to generate the information tips data to be displayed in the information tips module and send the information tips data to the microblog system server side;

The microblog system server side 32 is configured to receive the information tips data and generate the microblog based on the information tips data.

In one possible implementation, the microblog system server side 32 is configured to send the identifier of the microblog generated based on the information tips data to the information tips server side;

The information tips server side 31 is configured to send the information tips data to be displayed in the information tips module and the identifier of the microblog generated based on the information tips data to the client side.

In one possible implementation, the information tips data comprises: a title, an image, a summary and a link pointing to detailed information.

The microblog system server side 32 is specifically configured to create a microblog, convert the title of the information tips data into a topic of the microblog, convert the image of the information tips data into an image of the microblog, convert the summary of the information tips data into content of the microblog, and convert the link pointing to detailed information in the information tips data into a link in the microblog.

In this embodiment of the present disclosure, the client side may be instant messaging software, such as Tencent Microblog or Tencent QQ, which is provided to a user for direct operation. When the user logs in the client side and stays online, the information tips module may be popped up and displayed in the bottom right corner of the screen at a specific time. The information tips module may be in the form of a message box, and the information tips data may be displayed in the information tips module. For example, a news tips may be configured to display some valuable news contents.

The server side is a side as opposed to the client side, and facilitates the achieving of the function of the client side through corresponding data interaction with the client side. The server side is generally invisible to the user.

Embodiment 3

Figure 9:
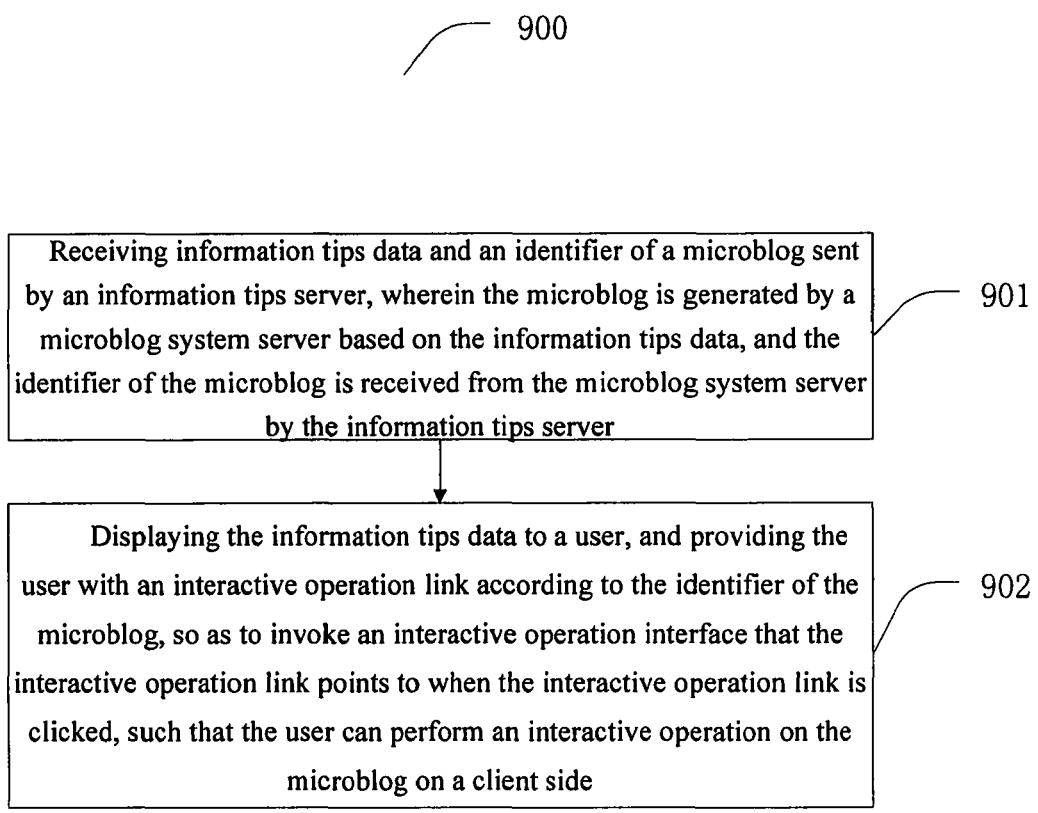
FIG. 9 illustrates a flow chart of a method for providing information according to Embodiment 3 of the present disclosure.

FIG. 9 illustrates a flow chart of a method 900 for providing information according to Embodiment 3 of the present disclosure. As shown in FIG. 9, the method 900 for providing information may comprise the following steps.

At step 901, information tips data and an identifier of a microblog sent by an information tips server are received, wherein the microblog is generated by a microblog system server based on the information tips data, and the identifier of the microblog is received from the microblog system server by the information tips server.

At step 902, the information tips data is displayed to a user, and according to the identifier of the microblog, an interactive operation link is provided to the user, so as to invoke an interactive operation interface that the interactive operation link points to when the interactive operation link is clicked, such that the user can perform an interactive operation on the microblog on a client side.

After the user logs in the client side, a server side corresponding to the client side, such as an information tips server, will frequently push valuable information tips data, such as news data, to the client side, so as for the user to learn the latest information promptly. However, besides viewing these information tips data, the user may also wish to perform interactive operations, such as share, rebroadcast, comment, etc., on these information tips data. By the method 900 for providing information according to this embodiment, an interactive operation by the user on the microblog generated based on the information tips data may be achieved, namely, achieving an interactive operation on the information tips data. Moreover, the interactive operation may be achieved by invoking the prior interactive operation interface of the microblog system server, without causing significant increase in the cost of development.

Figure 10:
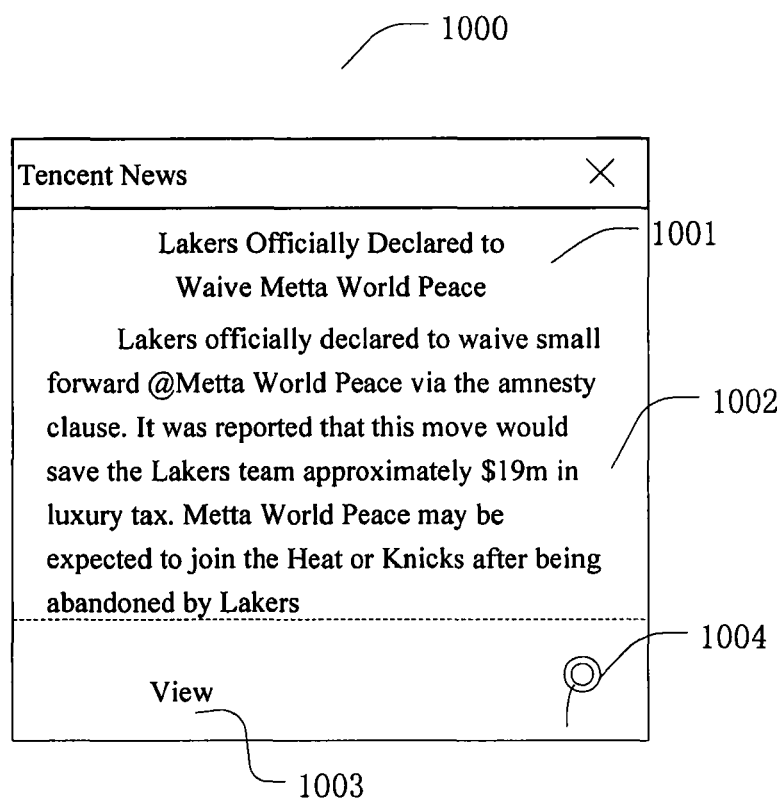
FIG. 10 illustrates a schematic diagram of a display interface for an information tips module according to Embodiment 3 of the present disclosure.

FIG. 10 illustrates a schematic diagram of a display interface for an information tips module 1000 according to Embodiment 3 of the present disclosure. In FIG. 10, Tencent QQ is used as an example of a client side. As shown in FIG. 10, the client side receives from an information tips server information tips data comprising a title 1001, content 1002 and a link 1003 pointing to detailed information. After receiving the information tips data from the information tips server, the client side may employ an information tips module 1000 to display the information tips data in the bottom right corner of the screen, and according to an identifier of a microblog received from the information tips server, provide an interactive operation link 1004 to be shown in the information tips module, such as in the bottom right corner of the information tips module. The identifier of the microblog may be, for example, a microblog ID. The interactive operation link may be, for example, a button in the style of a microblog icon, called as a microblog button for short.

According to an embodiment of the present disclosure, after the information tips data and the identifier of the microblog sent by the information tips server are received, it may be determined that the information tips data is a preset type of data. In normal conditions, the client side may receive from the information tips server a great variety of information tips data, such as news data, advertising data, service data, etc. In respect of such types of information tips data as advertising and service, a user normally only need to learn their content, and no interactive operation on them is required. Therefore, the client side may provide the user with an interactive operation link only for a preset type of information tips data. For example, the preset type of information tips data is news data. That is to say, the client side may provide the user with an interactive operation link only for news data. In this case, the client side may determine whether the information tips data is news data according to a parameter, such as an identifier, of the information tips data. If it is determined that the information tips data is news data, then subsequent operations of this embodiment will be executed. Otherwise, the interactive operation link will be hidden, that is, only the information tips data will be displayed to the user, with the interactive operation link not being provided.

According to an embodiment of the present disclosure, whether the user is a registered user of the microblog system server will be determined, prior to invoking the interactive operation interface that the interactive operation link points to. In the case that the user is not a registered user, a registration interface will be displayed to the user. In many circumstances, if having a microblog account registered on the microblog system server, the user may achieve interactive operations, such as rebroadcast, comment, etc., on the microblog. Therefore, through the abovementioned steps, operations of unregistered users may be restricted, thus providing better services for registered users. Thus, more users may be drawn to become registered users of the microblog system server.

Figure 11:
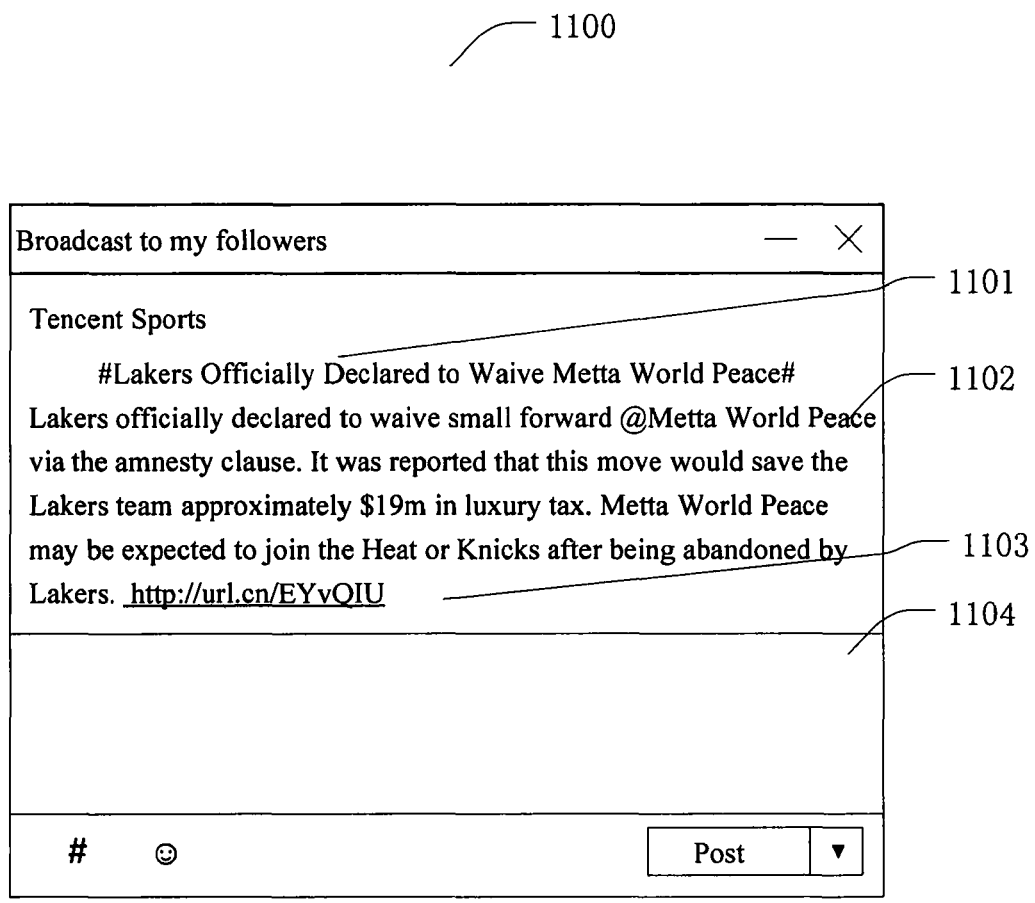
FIG. 11 illustrates a schematic diagram of a rebroadcast interface according to Embodiment 3 of the present disclosure.

According to an embodiment of the present disclosure, the interactive operation interface may be a rebroadcast interface for the microblog. That is to say, the user can rebroadcast the microblog generated based on the information tips data, so as to share intact content of the microblog to followers (or fans, friends, etc.) of the user. Since the microblog is generated based on the information tips data, by rebroadcast of the microblog, the user may share the entire, rather than a part of (such as, the title of the information tips data), content of the information tips data to followers of the user. FIG. 11 illustrates a schematic diagram of a rebroadcast interface 1100 according to Embodiment 3 of the present disclosure. In FIG. 11, Tencent QQ is used as an example of a client side. The microblog shown in FIG. 11 is generated by the microblog system server based on the information tips data shown in FIG. 10. As shown in FIG. 11, the title 1001 of the information tips data shown in FIG. 10 is converted into a topic 1101 of the microblog, the content 1002 of the information tips data is converted into content 1102 of the microblog, and the link 1003 pointing to detailed information in the information tips data is converted into a link 1103 of the microblog. Furthermore, the rebroadcast interface may also comprise an input box 1104, via which the user can comment on the microblog.

According to an embodiment of the present disclosure, the interactive operation interface may also comprise a share button (not shown in FIG. 11) for sharing a result of the interactive operation onto an additional information communication platform. For example, the user may share his/her rebroadcast of or comment on the microblog onto other information communication platforms than his/her microblog, such as Qzone, Friends network, Renren, QQ Group and other platforms, enabling more people to follow the microblog or the user's interactive operation on the microblog. The share button may also promote correlation among various platform products. This step may be implemented through the following operations: allowing access to various platform service modules, and providing options for the access to these platforms in the pull-down menu of the share button.

According to an embodiment of the present disclosure, this interactive operation interface may also comprise a shortcut sign button (not shown in FIG. 11) allowing for a comment on the microblog without requiring keyboard input by the user. There are times that the user may be so busy in working that he/she wishes to make a quick and simple comment on the microblog after learning the content thereof. Shortcut sign buttons, such as "Support", "Trample", "Silent Tribute" and other signs on the interactive operation interface may enable the user to comment without keyboard input.

According to an embodiment of the present disclosure, the interactive operation interface may also comprise a vote creation button (not shown in FIG. 11) for creating a vote for the microblog. The content of the microblog generated based on the information tips data may be controversial. The user may use the vote creation button to create a vote for the microblog, and summarize several opinions according to the content of the microblog, so as for other microblog users to express opinions and participate in the vote.

According to another aspect of the present disclosure, a client side for providing information is further provided. The client side may comprise a processor and a memory. The memory stores executable program code, which is operable to: when being executed by the processor, receive information tips data and an identifier of a microblog sent by an information tips server, wherein the microblog is generated by a microblog system server based on the information tips data, and the identifier of the microblog is received from the microblog system server by the information tips server; and display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

According to another aspect of the present disclosure, a non-transitory computer program product comprising executable program code for providing information is further provided. The executable program code is operable to: when being executed, receive information tips data and an identifier of a microblog sent by an information tips server, wherein the microblog is generated by a microblog system server based on the information tips data, and the identifier of the microblog is received from the microblog system server by the information tips server; and display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on a client side.

Those of ordinary skill in the art would be able to understand that the abovementioned executable program code is further operable to, when being executed by the processor, execute all the steps of the method 900 for providing information. For the sake of conciseness, no further description of the additional functions of the executable program code shall be provided herein. It should be noted that the code may directly enable the processor to perform a specified operation, be compiled to enable the processor to perform a specified operation, and/or be combined with other software, hardware, and/or firmware components (such as a library for performing standard functions) to enable the processor to perform a specified operation.

Embodiment 4

Figure 12:
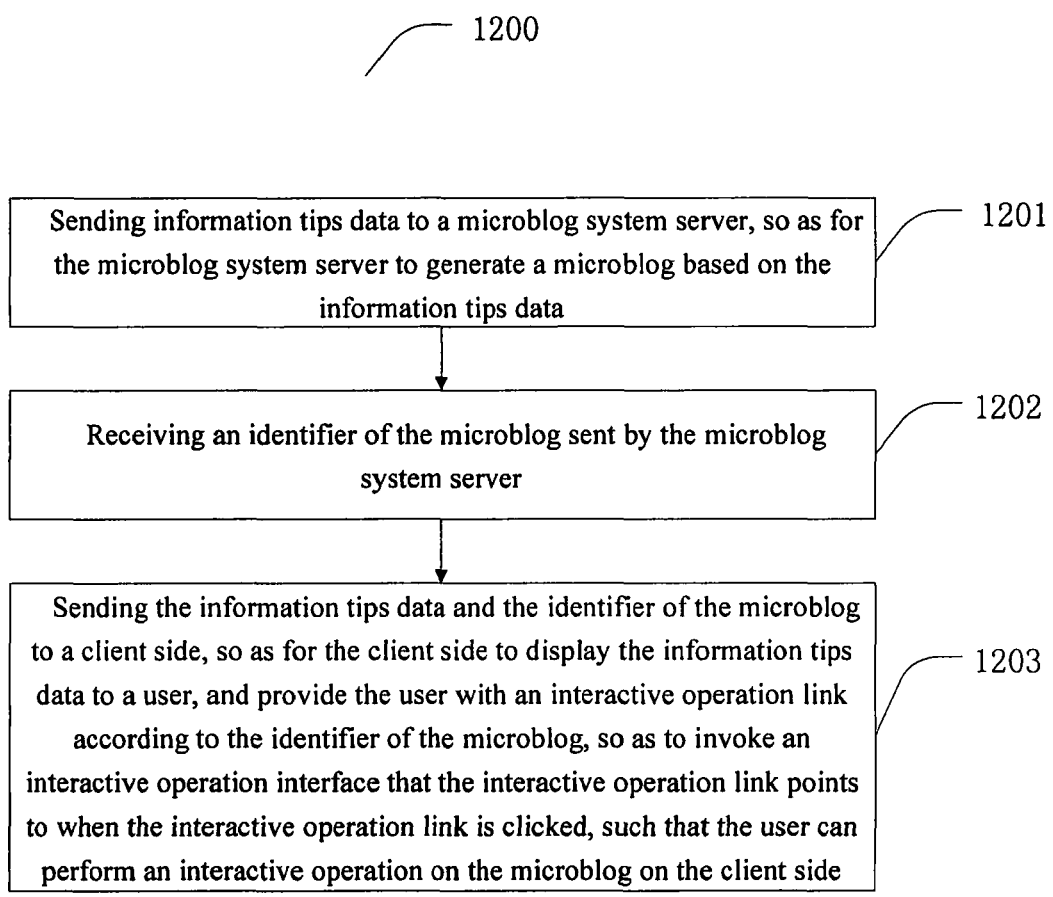
FIG. 12 illustrates a flow chart of a method for pushing information according to Embodiment 4 of the present disclosure.

FIG. 12 illustrates a flow chart of a method 1200 for pushing information according to Embodiment 4 of the present disclosure, whereby information tips data and an identifier of a microblog which are received in step 901 as mentioned above are pushed. As shown in FIG. 12, the method 1200 for pushing information comprises the following steps:

At step 1201, information tips data is sent to a microblog system server, so as for the microblog system server to generate a microblog based on the information tips data.

At step 1202, an identifier of the microblog sent by the microblog system server is received.

At step 1203, the information tips data and the identifier of the microblog are sent to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

By the abovementioned method 1200 for pushing information as provided by this embodiment, the identifier of the microblog generated based on the information tips data can be sent to the client side, so as for the client side to provide the user with an interactive operation link according to the identifier of the microblog.

According to an embodiment of the present disclosure, an information tips server may establish an independent module for sending information tips data to the microblog system server.

According to an embodiment of the present disclosure, the information tips data is determined as a preset type of data, prior to being sent to the microblog system server. As described above, the information tips server may only need to send a preset type of information tips data to the microblog system server. If the information tips data is determined as a preset type of information tips data, subsequent operations of this embodiment will be executed, that is, the information tips data will be sent to the microblog system server. Otherwise, the information tips data will be sent directly to the client side which then can display it to the user, without being sent to the microblog system server.

According to another aspect of the present disclosure, an information tips server for pushing information is further provided. The information tips server may comprise a processor and a memory. The memory stores executable program code, which is operable to: when being executed by the processor, send information tips data to a microblog system server, so as for the microblog system server to generate a microblog based on the information tips data; receive an identifier of the microblog sent by the microblog system server; and send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

According to another aspect of the present disclosure, a non-transitory computer program product comprising executable program code for pushing information is further provided. The executable program code is operable to: when being executed, send information tips data to a microblog system server, so as for the microblog system server to generate a microblog based on the information tips data; receive an identifier of the microblog sent by the microblog system server; and send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

Those of ordinary skill in the art would be able to understand that the abovementioned executable program code is further operable to, when being executed by the processor, execute all the steps of the method 1200 for pushing information. For the sake of conciseness, no further description of the additional functions of the executable program code shall be provided herein. It should be noted that the code may directly enable the processor to perform a specified operation, be compiled to enable the processor to perform a specified operation, and/or be combined with other software, hardware, and/or firmware components (such as a library for performing standard functions) to enable the processor to perform a specified operation.

Embodiment 5

Figure 13:
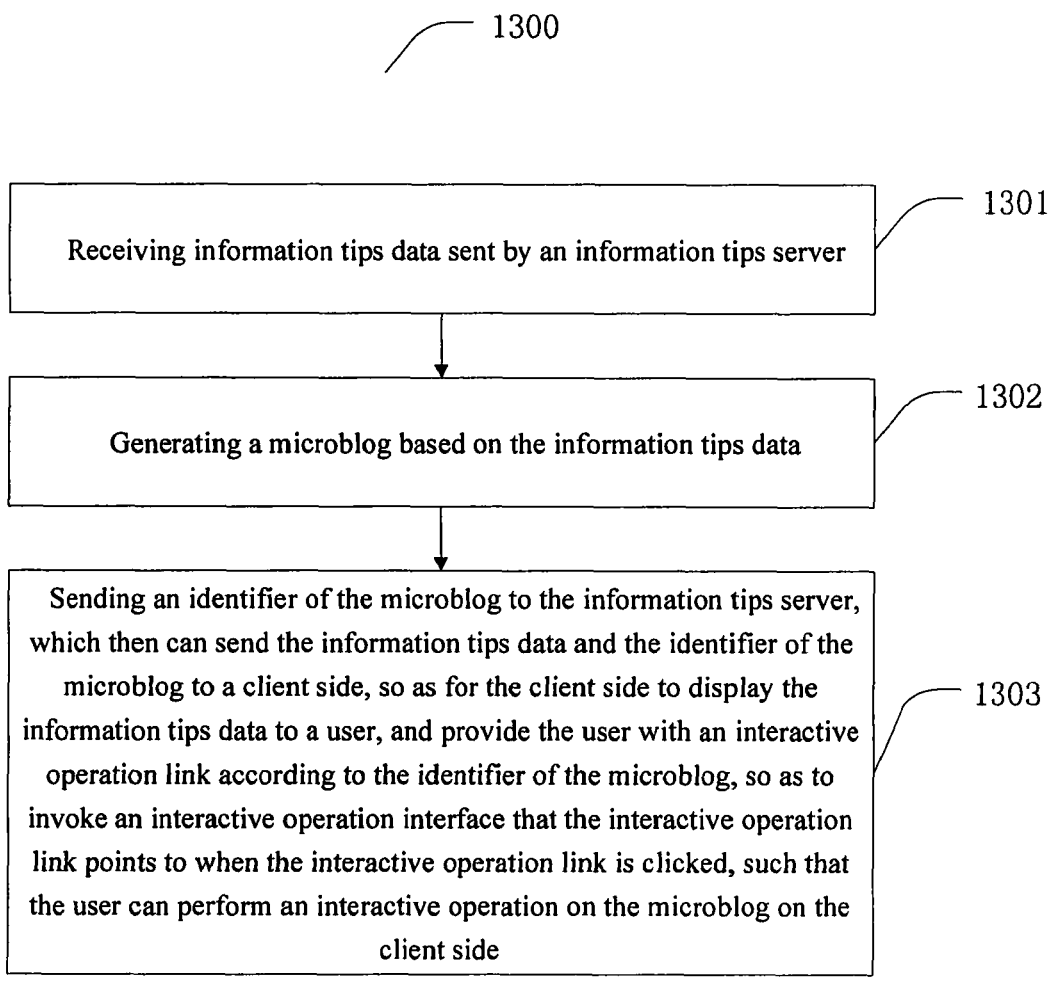
FIG. 13 illustrates a flow chart of a method for processing information according to Embodiment 5 of the present disclosure.

FIG. 13 illustrates a flow chart of a method 1300 for processing information according to Embodiment 5 of the present disclosure, whereby information tips data as sent in step 1201 is processed. As shown in FIG. 13, the method 1300 for processing information may comprise the following steps:

At step 1301, information tips data sent by an information tips server is received.

At step 1302, a microblog is generated based on the information tips data.

At step 1303, an identifier of the microblog is sent to the information tips server, which then can send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

By the abovementioned method 1300 for processing information as provided by this embodiment, a microblog may be generated based on information tips data and an identifier of the microblog may be sent to an information tips server. The information tips server sends the information tips data and the identifier of the microblog to a client side. When the user clicks an interactive operation link provided by the client side, the client side may invoke an interactive operation interface for the microblog, and perform an interactive operation on the microblog.

According to an embodiment of the present disclosure, a microblog system server may establish an independent module for receiving information tips data sent by the information tips server, and converting the information tips data into data of the microblog, that is, generating the microblog based on the information tips data.

The information tips data may comprise a title, content and a link pointing to detailed information. According to an embodiment of the present disclosure, generating a microblog based on the information tips data may comprise the following operations: converting a title of the information tips data into a topic of the microblog; converting content of the information tips data into content of the microblog; and converting a link pointing to detailed information in the information tips data into a link in the microblog. As a result, the generated microblog may comprise all contents of the information tips data. Furthermore, the information tips data may also comprise an image. The image of the information tips data may be converted into an image of the microblog. Furthermore, the information tips data may also comprise a video. The video of the information tips data may be converted into a video of the microblog. This method of converting is easy to implement, and enables the generated microblog to comprise all contents of the information tips data.

According to an embodiment of the present disclosure, after a microblog is generated based on the information tips data, the microblog may be broadcast. The microblog may be broadcast by an official microblog account or other accounts. If the microblog is to be broadcast by an official microblog account, the official microblog account corresponding to contents of the information tips data may be chosen. For example, if the contents of the information tips data relate to a basketball match, the microblog account "Tencent Sports" may be chosen to broadcast the microblog. Through being broadcast, the generated microblog may be shared to more users.

According to another aspect of the present disclosure, a microblog system server for processing information is further provided. The microblog system server may comprise a processor and a memory. The memory stores executable program data, which is operable to: when being executed by the processor, receive information tips data sent by an information tips server; generate a microblog based on the information tips data; and send an identifier of the microblog to the information tips server, which then can send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

According to another aspect of the present disclosure, a non-transitory computer program product comprising executable program code for processing information is further provided. The executable program code is operable to: when being executed, receive information tips data sent by an information tips server; generate a microblog based on the information tips data; and send an identifier of the microblog to the information tips server, which then can send the information tips data and the identifier of the microblog to a client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

Those of ordinary skill in the art would be able to understand that the abovementioned executable program code is further operable to, when being executed by the processor, execute all the steps of the method 1300 for processing information. For the sake of conciseness, no further description of the additional functions of the executable program code shall be provided herein. It should be noted that the code may directly enable the processor to perform a specified operation, be compiled to enable the processor to perform a specified operation, and/or be combined with other software, hardware, and/or firmware components (such as a library for performing standard functions) to enable the processor to perform a specified operation.

According to another aspect of the present disclosure, a server system is further provided, which comprises an information tips server and a microblog system server as described above. Please refer to the above description for operations accomplished by them, respectively, and no more detail shall be provided herein.

According to another aspect of the present disclosure, a method for pushing information to a client side is further provided, which comprises the following steps:

an information tips server sends information tips data to a microblog system server;

the microblog system server receives the information tips data;

the microblog system server generates a microblog based on the information tips data;

the microblog system server sends an identifier of the microblog to the information tips server;

the information tips server receives the identifier of the microblog; and the information tips server sends the information tips data and the identifier of the microblog to the client side, so as for the client side to display the information tips data to a user, and provide the user with an interactive operation link according to the identifier of the microblog, so as to invoke an interactive operation interface that the interactive operation link points to when the interactive operation link is clicked, such that the user can perform an interactive operation on the microblog on the client side.

Through the above description of embodiments, those skilled in the art would become well aware that the present disclosure may be implemented by means of software combined with indispensable universal hardware, or apparently, by means of hardware. Nevertheless, in many circumstances, the former would be a more optimal implementation. Based on such understanding, the technical solutions of the present disclosure in essence or in respect of the contribution made to the prior art may be embodied in the form of a software product. This computer software product is stored in a readable storage medium, such as a floppy disk, a hard disk or an optical disk, etc. of a computer, including several instructions configured to enable a computer device (which may be a personal computer, a server, or a network device, etc.) to implement the methods according to embodiments of the present disclosure.

The foregoing description only relates to some embodiments of the present disclosure, and is not intended to limit the scope of protection of the present disclosure thereto. Any change or alternative that those skilled in and familiar with the art would easily envisage within the technical scope disclosed by the present disclosure shall fall within the scope of protection of the present disclosure. Therefore, the scope of protection of the present disclosure shall be subject to the scope of protection sought for by the claims.

What is claimed is:

1. A method for providing information executed by a client including a memory and a processor coupled to the memory, the method comprising:

receiving, by the processor, information tips data and an identifier of a microblog from an information tips server;

generating, by the processor, a message interface that includes the information tips data and an interactive operation link, wherein the information tips data includes a first article part, the first article part including an article title, wherein the interactive operation link is positioned on the message interface at a first position, the article title is positioned on the message interface at a second position different from the first position, and wherein the interactive operation link is generated according to the identifier of the microblog;

displaying, by the processor, the message interface on a screen of the client;

receiving, by the processor, a selection of the interactive operation link in the message interface;

invoking, by the processor, an interactive operation interface upon receipt of the selection of the interactive operation link wherein the interactive operation interface is an interface different from the message interface;

converting, by the processor, the first article part into a second article part, the second article part including the article title from the first article part;

displaying, by the processor, the second article part on the interactive operation interface; and presenting, by the processor, on the interactive operation interface an option-to-broadcast, wherein the second article part is distributed upon a selection of the option-to-broadcast.

2. The method according to claim 1, wherein the interactive operation link is a sole interface in the message interface that allows a display of the interactive operation interface.

3. The method according to claim 1, further comprising:
determining whether the information tips data is data of a preset type;
generating the message interface that includes the information tips data and the interactive operation link if the information tips data is the preset type; and
generating the message interface that includes the information tips data and excludes the interactive operation link if the information tips data is not the preset type.

4. The method according to claim 1, further comprising:
displaying, by the processor, a comment box on the interactive operation interface to allow entry of comments from a user.

5. The method according to claim 1, further comprising:
in response to receiving the selection of the interactive operation link in the message interface, determining whether the user is a registered user of a microblog system server; and
displaying a registration page to the user if the user is not a registered user, prior to invoking the interactive operation interface.

6. The method according to claim 1, further comprising:
displaying, by the processor, on the interactive operation interface, at least one of:
a share button for sharing a result of the interactive operation onto an additional information communication platform;
a shortcut sign button allowing for a comment on the microblog without requiring keyboard input by the user; and
a vote creation button for creating a vote for the microblog.

7. A device for providing information, comprising: a memory; and a processor coupled to the memory, wherein the processor is configured to perform:
receiving information tips data and an identifier of a microblog from an information tips server;
generating a message interface that includes the information tips data and an interactive operation link, wherein the information tips data includes a first article part, the first article part including an article title, wherein the interactive operation link is positioned on the message interface at a first position, the article title is positioned on the message interface at a second position different from the first position, and wherein the interactive operation link is generated according to the identifier of the microblog;

displaying the message interface on a screen of the client;

receiving a selection of the interactive operation link in the message interface;

invoking an interactive operation interface upon receipt of the selection of the interactive operation link;

converting the first article part into a second article part, the second article part including the article title from the first article part;

displaying the second article part on the interactive operation interface; and presenting on the interactive operation interface an option-to-broadcast, wherein the second article part is distributed upon a selection of the option-to-broadcast.

8. The device according to claim 7, wherein the interactive operation link is a sole interface in the message interface that allows a display of the interactive operation interface.

9. The device according to claim 7, wherein the processor is further configured to perform:
determining whether the information tips data is data of a preset type;
generating the message interface that includes the information tips data and the interactive operation link if the information tips data is the preset type; and
generating the message interface that includes the information tips data and excludes the interface operation link if the information tips data is not the preset type.

10. The device according to claim 7, wherein the processor is further configured to perform:
displaying a comment box on the interactive operation interface to allow entry of comments from a user.

11. The device according to claim 7, wherein the processor is further configured to perform:
in response to receiving the selection of the interactive operation link in the message interface, determining whether the user is a registered user of a microblog system server; and
displaying a registration page to the user if the user is not a registered user, prior to invoking the interactive operation interface.

12. The device according to claim 7, wherein the processor is further configured to perform:
displaying on the interactive operation interface at least one of:
a share button for sharing a result of the interactive operation onto an additional information communication platform;
a shortcut sign button allowing for a comment on the microblog without requiring keyboard input by the user; and
a vote creation button for creating a vote for the microblog.

13. A non-transitory computer-readable storage medium storing computer program instructions executable by a processor to perform:
receiving information tips data and an identifier of a microblog from an information tips server;

generating a message interface that includes the information tips data and an interactive operation link, wherein the information tips data includes a first article part, the first article part including an article title, wherein the interactive operation link is positioned on the message interface at a first position, the article title is positioned on the message interface at a second position different from the first position, and wherein the interactive operation link is generated according to the identifier of the microblog;

displaying the message interface on a screen of the client;

receiving a selection of the interactive operation link in the message interface;

invoking an interactive operation interface upon receipt of the selection of the interactive operation link, wherein the interactive operation interface is an interface different from the message interface;

converting the first article part into a second article part, the second article part including the article title from the first article part;

displaying the second article part on the interactive operation interface; and presenting on the interactive operation interface an option-to-broadcast, wherein the second article part is distributed upon a selection of the option-to-broadcast.

14. The storage medium according to claim 13, wherein the interactive operation link is a sole interface in the message interface that allows a display of the interactive operation interface.

15. The storage medium according to claim 13, wherein the computer program instructions further cause the processor to perform:

determining whether the information tips data is data of a preset type;

generating the message interface that includes the information tips data and the interactive operation link if the information tips data is the preset type; and generating the message interface that includes the information tips data and excludes the interactive operation link if the information tips data is not the preset type.

16. The storage medium according to claim 13, wherein the computer program instructions further cause the processor to perform:

displaying a comment box on the interactive operation interface to allow entry of comments from a user.

17. The storage medium according to claim 13, wherein the computer program instructions further cause the processor to perform:

in response to receiving the selection of the interactive operation link in the message interface, determining whether the user is a registered user of a microblog system server; and displaying a registration page to the user if the user is not a registered user, prior to invoking the interactive operation interface.

18. The storage medium according to claim 13, wherein the the computer program instructions further cause the processor to perform:

displaying on the interactive operation interface at least one of:

a share button for sharing a result of the interactive operation onto an additional information communication platform;

a shortcut sign button allowing for a comment on the microblog without requiring keyboard input by the user; or a vote creation button for creating a vote for the microblog.

19. The method according to claim 1, wherein the interactive operation link is presented on the message interface as an icon or a button.

20. The method according to claim 1, wherein the interactive operation link is presented below the first article part on the message interface.

* * * * *